United States Patent
Qiu et al.

(10) Patent No.: US 9,600,202 B2
(45) Date of Patent: Mar. 21, 2017

(54) METHOD AND DEVICE FOR IMPLEMENTING MEMORY MIGRATION

(71) Applicant: Huawei Technologies Co., Ltd., Shenzhen, Guangdong (CN)

(72) Inventors: Xishi Qiu, Shenzhen (CN); Wei Wang, Shenzhen (CN); Gaohuai Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 559 days.

(21) Appl. No.: 14/035,545

(22) Filed: Sep. 24, 2013

(65) Prior Publication Data

US 2014/0052948 A1 Feb. 20, 2014

Related U.S. Application Data

(63) Continuation of application No. PCT/CN2011/077748, filed on Jul. 28, 2011.

(51) Int. Cl.
*G06F 12/00* (2006.01)
*G06F 3/06* (2006.01)
(Continued)

(52) U.S. Cl.
CPC ............ *G06F 3/0647* (2013.01); *G06F 3/067* (2013.01); *G06F 3/0619* (2013.01); *G06F 9/485* (2013.01);
(Continued)

(58) Field of Classification Search
None
See application file for complete search history.

(56) References Cited

U.S. PATENT DOCUMENTS

| 5,862,314 A | 1/1999 | Jeddeloh |
| 6,397,349 B2 | 5/2002 | Higgins et al. |

(Continued)

FOREIGN PATENT DOCUMENTS

| CN | 1581082 A | 2/2005 |
| CN | 101218557 A | 7/2008 |

(Continued)

OTHER PUBLICATIONS

International Search Report in corresponding PCT Patent Application No. PCT/CN2011/077748 (Dec. 15, 2011).

*Primary Examiner* — Reginald Bragdon
*Assistant Examiner* — Michael Westbrook
(74) *Attorney, Agent, or Firm* — Leydig, Voit & Mayer, Ltd.

(57) ABSTRACT

Disclosed are a method and device for implementing memory migration, which relate to computer technology and are invented for solving the problem that the existing operating process for memory migration is relatively complicated. The technical solution provided in the embodiments of the present application includes: the basic input-output system of a computer migrating the data in the memory to be migrated to a first unavailable memory in the operating system of the computer when migrating the memory to be migrated and the basic input-output system storing the mapping relationship between the memory to be migrated and the physical address of the first unavailable memory. The embodiments of the present application can be applied to ordinary computer systems and computer systems under the NUMA architecture.

16 Claims, 14 Drawing Sheets migrating, when a memory to be migrated is migrated, by a basic input-output system of a computer, data in the memory to be migrated to a first unusable memory for an operating system of the computer — 101 storing, by the basic input-output system, a mapping relation between a physical address of the memory to be migrated and physical addresses of the first unusable memory — 102

(51) Int. Cl.
*G06F 9/48* (2006.01)
*G06F 12/02* (2006.01)
*G06F 11/14* (2006.01)

(52) U.S. Cl.
CPC ...... *G06F 12/0292* (2013.01); *G06F 11/1456* (2013.01); *G06F 2212/1032* (2013.01); *G06F 2212/2542* (2013.01)

(56) References Cited

U.S. PATENT DOCUMENTS

| | | |
|---|---|---|
| 7,103,728 B2 | 9/2006 | Sharma et al. |
| 2004/0100715 A1 | 5/2004 | Smith et al. |
| 2005/0038932 A1 | 2/2005 | Himmel et al. |
| 2005/0188278 A1* | 8/2005 | Zimmer ................ G06F 11/106 714/42 |
| 2005/0246508 A1 | 11/2005 | Shaw |
| 2007/0011420 A1 | 1/2007 | Boss et al. |
| 2007/0061612 A1 | 3/2007 | Henderson et al. |
| 2007/0106860 A1 | 5/2007 | Foster, Sr. et al. |
| 2008/0052473 A1 | 2/2008 | Yagi et al. |
| 2011/0161726 A1 | 6/2011 | Swanson et al. |
| 2012/0110237 A1 | 5/2012 | Li et al. |

FOREIGN PATENT DOCUMENTS

| | | |
|---|---|---|
| CN | 101818542 A | 9/2010 |
| CN | 102081552 A | 6/2011 |
| JP | 2004079140 A | 3/2004 |
| JP | 2007122259 A | 5/2007 |
| JP | 2007133879 A | 5/2007 |
| JP | 2008033588 A | 2/2008 |
| JP | 2009500705 A | 1/2009 |

\* cited by examiner

METHOD AND DEVICE FOR IMPLEMENTING MEMORY MIGRATION

CROSS-REFERENCE TO RELATED APPLICATIONS

This application is a continuation of International Patent Application No. PCT/CN2011/077748, filed on Jul. 28, 2011, which is hereby incorporated by reference in its entirety.

FIELD OF APPLICATION

The present application relates to computer technologies, and more particularly to a method and a device for implementing memory migration.

BACKGROUND OF THE APPLICATION

As one of the important component parts of a computer, the memory greatly affects the computer by its performance. With the rapid increase in capacity of server memory, the error rate of the memory is also significantly increased. Errors in the memory cause interruption of services or downtime of the system, and bring irretrievable losses to the user. In order to enhance error-tolerant rate of the system, it is possible to migrate and isolate memory regions where errors repetitively occur, and this case is usually the migration at a granular size of one or several memory pages. Memory migration can also reduce power consumption of the system, and this case is usually the migration at large granularity which generally reaches the level of Dual-Inline-Memory-Modules (DIMMs).

In the prior-art, the specific process for implementing memory migration comprises the following steps: upon receipt of a memory migration instruction sent by a management program in an operating system (OS), the relevant controller of the system initializes a backup memory to readdress the address space of the backup memory and the address space of the memory to be migrated so that the backup memory and the memory to be migrated use the same address bus; the basic input-output system (BIOS) copies data in the memory to be migrated to the backup memory; upon completion of the copying, the memory to be migrated is stopped for use and the backup memory is initiated for use, so that when the OS again accesses the memory to be migrated, data stored in the backup memory can be directly accessed via the physical address of the original memory to be migrated.

It is necessary in the prior-art technology to initialize the backup memory each time a memory is migrated, so the operating process for memory migration is relatively complicated.

SUMMARY OF THE APPLICATION

Embodiments of the present application provide a method and a device for implementing memory migration, so as to implement memory migration through a simple operating process.

According to one aspect, there is provided a method for implementing memory migration comprising: migrating, when a memory to be migrated is migrated, by a basic input-output system of a computer, data in the memory to be migrated to a first unusable memory of an operating system of the computer, wherein the first unusable memory is converted in advance from an original usable memory of the operating system, which is a memory set as reserved for the operating system, and unmodifiable by and inaccessible to the operating system; and storing, by the basic input-output system, a mapping relation between a physical address of the memory to be migrated and a physical address of the first unusable memory.

According to another aspect, there is provided a device for implementing memory migration comprising:

a first migrating module, configured to migrate, when a memory to be migrated is migrated, by a basic input-output system of a computer, data in the memory to be migrated to a first unusable memory of an operating system of the computer, wherein the first unusable memory is converted in advance from an original usable memory of the operating system, which is a memory set as reserved for the operating system, and unmodifiable by and inaccessible to the operating system; and a storing module configured to store, by the basic input-output system, a mapping relation between a physical address of the memory to be migrated and a physical address of the first unusable memory.

By the method and the device for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

BRIEF DESCRIPTION OF THE DRAWINGS

To make clearer the explanation of technical solutions of the embodiments of the present application or of the prior art, accompanying drawings required to be used in the description of the embodiments or of the prior art are briefly illustrated below. Apparently, the accompanying drawings illustrated below are merely directed to some embodiments of the present application, and it is possible for persons ordinarily skilled in the art to deduce other drawings from these drawings without creative effort.

DETAILED DESCRIPTION OF THE EMBODIMENTS

The technical solutions according to the embodiments of the present application will be clearly and completely described below with reference to the accompanying drawings in the embodiments of the present application. Apparently, the embodiments as described below are merely partial, rather than entire, embodiments of the present application. On the basis of the embodiments of the present application, all other embodiments obtainable by persons ordinarily skilled in the art without creative effort shall all fall within the protection scope of the present application.

In order to solve the problem, that is, the memory migration operating process is relatively complicated, in the prior art, embodiments of the present application provide a method and a device for implementing memory migration.

Figure 1:
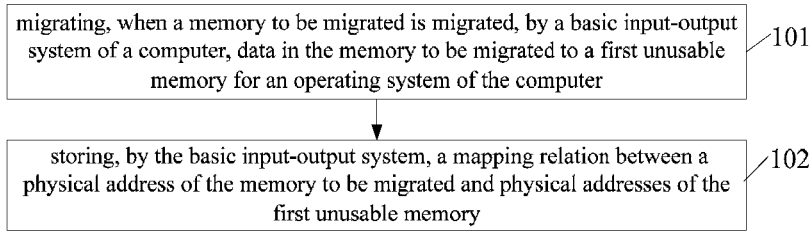
FIG. 1 is a flowchart illustrating the method for implementing memory migration provided by Embodiment 1 of the present application.

As shown in FIG. 1, the method for implementing memory migration provided by Embodiment 1 of the present application comprises the following steps.

Step 101—migrating, when a memory to be migrated is migrated, by a basic input-output system of a computer, data in the memory to be migrated to a first unusable memory of an operating system of the computer.

In this embodiment, in the process of migrating data in the memory to be migrated to a first unusable memory of an operating system (OS) of the computer through Step 101, the data in the memory to be migrated can be copied to the first unusable memory, or the like, while no restriction is made thereto. The first unusable memory may be a memory which is converted in advance from an original usable memory of the OS, and set as reserved for the OS, and unmodifiable by and inaccessible to the OS. When the system starts up to address the memory to generate an e820 map, the BIOS may address the memory uniformly to make a part of the memory usable for the OS and another part of the memory unusable for the OS.

In this embodiment, since the original unusable memory of the OS of the computer is usually occupied by the original process of the computer, the first unusable memory of the OS in Step 101 can be a part of memory converted in advance from the original usable memory of the OS, and can also be a part of memory newly configured by the OS by other means, which are not redundantly described seriatim herein. That is to say, migrating the data in the memory to be migrated to the first unusable memory of the OS can be to migrate the data in the memory to be migrated to any position in the memory converted in advance from the original usable memory, and can also be to sequentially migrate the data in the remaining memory to the memory converted in advance from the original usable memory according to the order of the physical addresses of the memory converted in advance from the original usable memory, while the details are not redundantly described seriatim herein.

In this embodiment, the memory to be migrated in Step 101 can be a small granular memory in which repetitive errors have been found to occur in a certain memory by a management program of the OS and thereby in need of migration and isolation, and can also be a node memory in need of hot removal in order to reduce power consumption of the system in a non uniform memory access (NUMA) architecture. It can as well be a memory that should be migrated under other circumstances, which are not redundantly described seriatim herein.

Step 102—storing, by the basic input-output system, a mapping relation between a physical address of the memory to be migrated and a physical address of the first unusable memory.

In this embodiment, the mapping relation between a physical address of the memory to be migrated and a physical address of the first unusable memory in Step 102 can be a mapping relation between a physical address, after memory page alignment, of the memory to be migrated and a physical address, after memory page alignment, of the first unusable memory, or the like, while the details are not redundantly described seriatim herein. The mapping relation can be stored in any position of the computer, and can also be stored in such a storage device as a flash memory separately provided for mapping relations. It is also possible to store the mapping relation by other means, which are not redundantly described seriatim herein.

The method for implementing memory migration provided by this embodiment can be implemented by combining the basic input-output system (BIOS) with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 2:
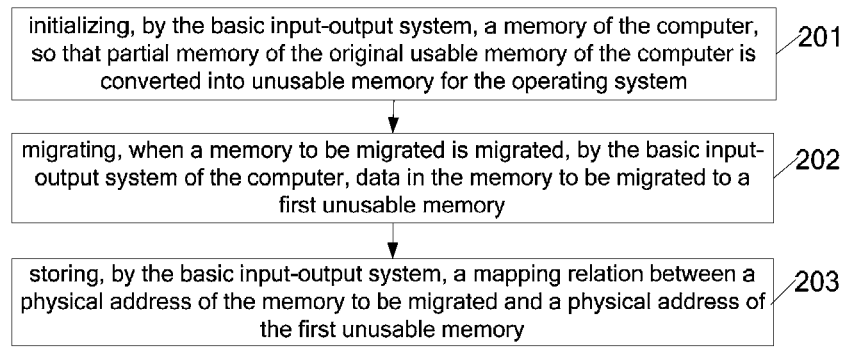
FIG. 2 is a flowchart illustrating the method for implementing memory migration provided by Embodiment 2 of the present application.

As shown in FIG. 2, the method for implementing memory migration provided by Embodiment 2 of the present application comprises the following steps.

Step 201—initializing, by the basic input-output system, a memory of the computer, so that partial memory of the original usable memory of the computer is converted into unusable memory of the operating system.

In this embodiment, in order to simplify the memory migration operating process, the process of initializing the memory of the computer through Step 201 can be performed during startup of the computer system. The process of initializing the memory of the computer through Step 201 can be implemented by addressing the memory to generate an e820 map, and can also be implemented by other means, which are not redundantly described seriatim herein. Initializing of the memory of the computer in Step 201 can not only comprise converting partial memory of the original usable memory of the computer into memory unusable for the OS, but also comprise setting the size of the unusable memory of the OS, or the like, while no restriction is made thereto. Setting the size of the unusable memory of the OS can be not only to set the unusable memory of the OS as a memory of fixed size, but also to set the unusable memory of the OS as a memory of adjustable size—that is to say, the size of the unusable memory of the OS is set in the BIOS according to the size of the system memory.

Step 202 to Step 203—migrating the memory to be migrated by the basic input-output system of the computer, and storing a mapping relation between a physical address of the memory to be migrated and a physical address of the first unusable memory.

In this embodiment, the first unusable memory in Step 202 to Step 203 can be a part of the unusable memory obtained by the conversion in Step 201, and this is not redundantly described herein. The specific processes of Step 202 to Step 203 can be seen with reference to Step 101 to Step 102 shown in FIG. 1, while the details are not redundantly described seriatim herein.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 3:
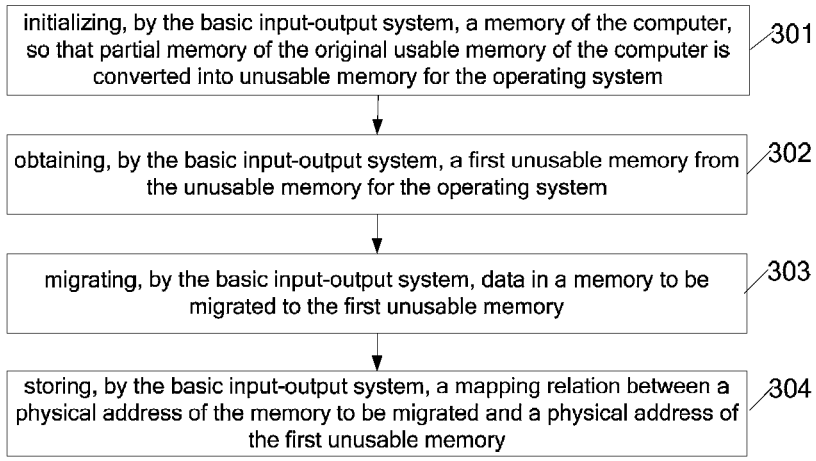
FIG. 3 is a flowchart illustrating the method for implementing memory migration provided by Embodiment 3 of the present application.

As shown in FIG. 3, the method for implementing memory migration provided by Embodiment 3 of the present application comprises the following steps.

Step 301—initializing, by the basic input-output system, a memory of the computer. The specific process thereof can be seen with reference to Step 201 shown in FIG. 2, while the details are not redundantly described seriatim herein.

Step 302—obtaining, by the basic input-output system, a first unusable memory from the unusable memory of the operating system.

In this embodiment, obtaining the first unusable memory from the unusable memory through Step 302 can be that the BIOS obtains the first unusable memory sized as the memory to be migrated sequentially from the unusable memory according to the order of the physical addresses of the unusable memory.

Step 303—migrating, by the basic input-output system, data in the memory to be migrated to the first unusable memory.

In this embodiment, the process of migrating data in the memory to be migrated to the first unusable memory through Step 303 can be to copy the data in the memory to be migrated to the first unusable memory, or the like, while no restriction is made thereto.

Step 304—storing, by the basic input-output system, a mapping relation between a physical address of the memory to be migrated and a physical address of the first unusable memory. The specific process thereof can be seen with reference to Step 102 shown in FIG. 1, while the details are not redundantly described seriatim herein.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 4:
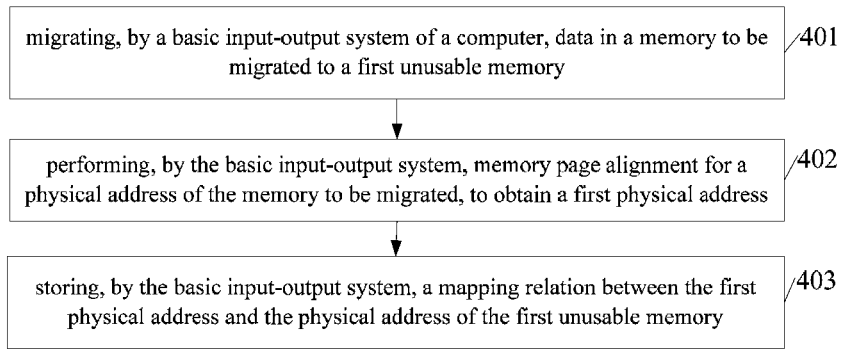
FIG. 4 is a flowchart illustrating the method for implementing memory migration provided by Embodiment 4 of the present application.

As shown in FIG. 4, the method for implementing memory migration provided by Embodiment 4 of the present application comprises the following steps.

Step 401—migrating, by a basic input-output system of a computer, data in the memory to be migrated to a first unusable memory. The specific process thereof can be seen with reference to Step 101 shown in FIG. 1, while the details are not redundantly described seriatim herein.

Step 402—performing, by the basic input-output system, memory page alignment for a physical address of the memory to be migrated, to obtain a first physical address.

Step 403—storing, by the basic input-output system, a mapping relation between the first physical address and the physical address of the first unusable memory.

In this embodiment, in order to facilitate the OS to subsequently use data in the remaining memory, it is possible to firstly align the physical address of the memory to be migrated through Step 402, and then to store the mapping relation between the physical address of the aligned remaining memory and the physical address of the first unusable memory through Step 403.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 5:
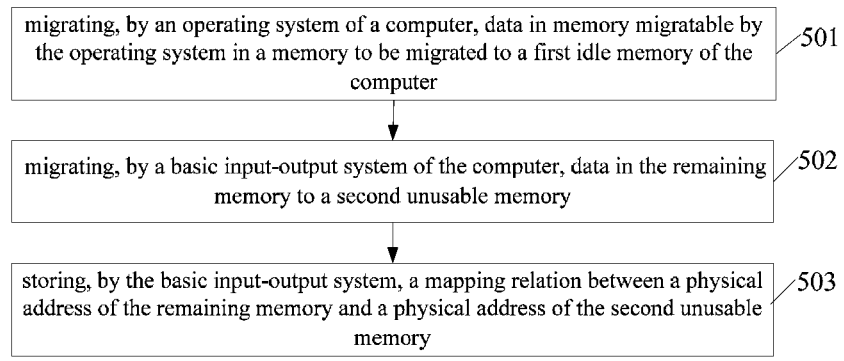
FIG. 5 is a flowchart illustrating the method for implementing memory migration provided by Embodiment 5 of the present application.

As shown in FIG. 5, the method for implementing memory migration provided by Embodiment 5 of the present application comprises the following steps.

Step 501—migrating, by an operating system of a computer, data in memory migratable by the operating system in the memory to be migrated to a first idle memory of the computer.

In this embodiment, since the OS can implement migration of partial memory, but cannot implement migration of most kernel mode memory, the memory migratable by the operating system in Step 501 may comprise a mass of user mode memory and/or a few of kernel mode memory.

In this embodiment, the first idle memory in Step 501 can be a part of the memory currently not occupied by the computer; that is to say, migrating the data in the memory migratable by the OS to the first idle memory can be to migrate the data in the memory migratable by the OS to any position in the memory currently not occupied by the computer, and can also be to sequentially migrate the data in the memory migratable by the OS to the memory currently not occupied by the computer according to the order of the physical addresses of the memory currently not occupied by the computer, while the details are not redundantly described seriatim herein.

In this embodiment, migrating the data in the memory migratable by the OS to the first idle memory in Step 501 may comprise firstly performing a sleeping operation, by the OS, on all processes that refer to the memory migratable by the OS, secondly allocating a part of the memory, namely the first idle memory, in the memory currently not occupied by the computer, and migrating the data in the memory migratable by the OS to the first idle memory, subsequently deleting, by the OS, page table entries corresponding to the memory migratable by the OS, and updating page table entries in all processes that refer to the memory migratable by the OS so that they are directed to the first idle memory, and finally waking the sleeping processes by the OS. In Step 501 the data in the memory migratable by the OS can also be migrated to the first idle memory by other means, while no restriction is made thereto. The memory allocated by the OS in the memory currently not occupied by the computer can be a preset memory of a fixed size, or a memory allocated according to the size of the memory migratable by the OS, or a memory allocated by other means, which are not redundantly described seriatim herein.

In this embodiment, migrating the data in the memory migratable by the OS to the first idle memory through Step 501 can be not only directly to migrate the data in the memory migratable by the OS to the first idle memory, but also to firstly query whether the memory migratable by the OS is currently in use, and if yes, to migrate the data in the memory migratable by the OS to the first idle memory. It is also possible to migrate the data in the memory migratable by the OS to the first idle memory by other means, which are not redundantly described seriatim herein.

In this embodiment, the memory to be migrated in Step 501 can be a small granular memory in which repetitive errors have been found to occur in a certain memory by a management program of the OS and hence in need of migration and isolation, and can also be a node memory in need of hot removal in order to reduce power consumption of the system in an NUMA architecture. It can as well be a memory that should be migrated under other circumstances, which are not redundantly described seriatim herein.

Step 502—migrating, by a basic input-output system of the computer, data in the remaining memory to a second unusable memory.

In this embodiment, migrating the data in the memory migratable by the OS to the first idle memory in Step 501 is implemented by the OS, while migrating the data in the remaining memory to the second unusable memory in Step 502 is implemented by the BIOS. In order to transfer the control right of the computer system from the OS to the BIOS, it is possible to implement the transfer by letting the OS sleep, or by other means, which are not redundantly described seriatim herein. The remaining memory in Step 502 may be the memory in the memory to be migrated except the memory migratable by the OS.

In this embodiment, the process of migrating the data in the remaining memory to the second unusable memory through Step 501 may be to copy the data in the remaining memory to the second unusable memory, or the like, while no restriction is made thereto. The second unusable memory can be a part of the first unusable memory.

Step 503—storing, by the basic input-output system, a mapping relation between a physical address of the remaining memory and a physical address of the second unusable memory.

In this embodiment, the process of storing a mapping relation between a physical address of the remaining memory and a physical address of the second unusable memory through Step 503 can be seen with reference to Step 102 shown in FIG. 1, while the details are not redundantly described seriatim herein.

The method for implementing memory migration provided by this embodiment can be implemented by combining the BIOS with corresponding computer hardware, and the details are not redundantly described seriatim herein.

The method for implementing memory migration provided by the embodiments of the present application implements memory migration through the OS in combination of the BIOS of the computer, and enhances flexibility of memory migration.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 6:
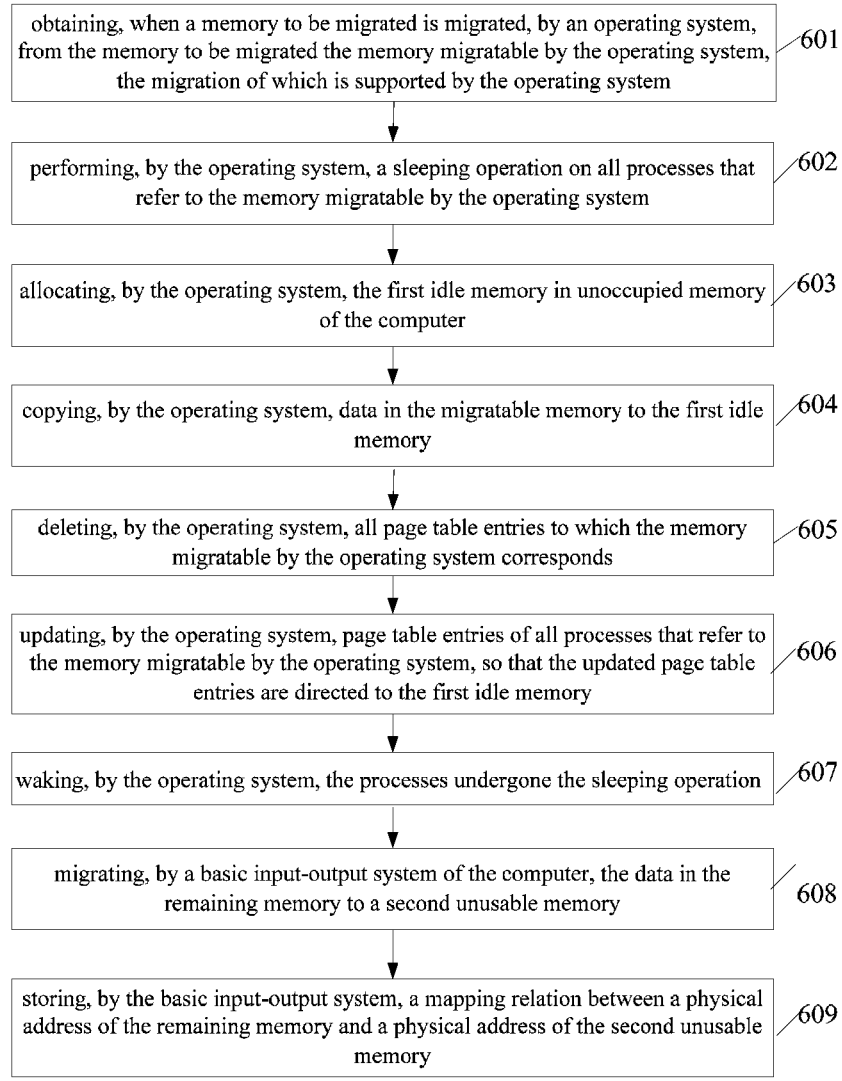
FIG. 6 is a flowchart illustrating the method for implementing memory migration provided by Embodiment 6 of the present application.

As shown in FIG. 6, the method for implementing memory migration provided by Embodiment 6 of the present application comprises the following steps.

Step 601—obtaining, when the memory to be migrated is migrated, by an operating system, from the memory to be migrated the memory migratable by the operating system, the migration of which is supported by the operating system.

In this embodiment, since the OS can implement migration of partial memory, but cannot implement migration of most kernel mode memory, the memory migratable by the OS in Step 601 may mainly comprise user mode memory, and may also comprise a few of kernel mode memory.

In this embodiment, obtaining from the memory to be migrated the memory migratable by the OS, the migration of which is supported by the OS, through Step 601 can be that not only the OS directly obtains the memory migratable by the OS from the memory to be migrated, but also the OS firstly determines the memory to be migrated, and then obtains the memory migratable by the OS from the memory to be migrated according to the determination result. It is also possible for the OS to obtain the memory migratable by the OS from the memory to be migrated by other means, which are not redundantly described seriatim herein.

Step 602—performing, by the operating system, a sleeping operation on all processes that refer to the memory migratable by the operating system.

Step 603—allocating, by the operating system, the first idle memory in unoccupied memory of the computer.

In this embodiment, allocating the first idle memory in unoccupied memory of the computer in Step 603 can be not only to allocate the first idle memory to any position of the unoccupied memory of the computer, but also to sequentially allocate the first idle memory according to the order of the physical addresses of the unoccupied memory of the computer, while the details are not redundantly described seriatim herein.

Step 604—copying, by the operating system, data in the migratable memory to the first idle memory.

Step 605—deleting, by the operating system, all page table entries to which the memory migratable by the operating system corresponds.

Step 606—updating, by the operating system, page table entries of all processes that refer to the memory migratable by the operating system, so that the updated page table entries are directed to the first idle memory.

Step 607—waking, by the operating system, the processes undergone the sleeping operation.

In this embodiment, the processes undergone the sleeping operation in Step 602 can be woken through Step 607, so that these processes can continue to perform relevant operations.

Step 608 to Step 609—migrating, by a basic input-output system, the data in the remaining memory to a second unusable memory, and storing a mapping relation between a physical address of the remaining memory and a physical address of the second unusable memory. The specific processes thereof can be seen with reference to Step 502 to Step 503 shown in FIG. 5, while the details are not redundantly described seriatim herein.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 7:
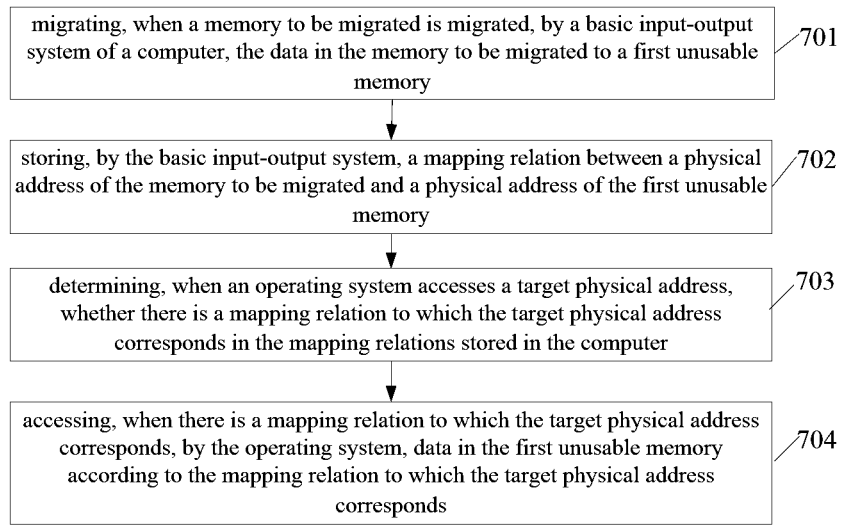
FIG. 7 is a first flowchart illustrating the method for implementing memory migration provided by Embodiment 7 of the present application.

As shown in FIG. 7, the method for implementing memory migration provided by Embodiment 7 of the present application comprises the following steps.

Step 701 to Step 702—migrating, when the memory to be migrated is migrated, by a basic input-output system, the data in the memory to be migrated to the first unusable memory, and storing a mapping relation between a physical address of the memory to be migrated and a physical address of the first unusable memory. The specific processes thereof can be seen with reference to Step 101 to Step 102 shown in FIG. 1, while the details are not redundantly described seriatim herein.

Step 703—determining, when an operating system accesses a target physical address, whether there is a mapping relation to which the target physical address corresponds in the mapping relations stored in the computer.

In this embodiment, when the mapping relation between a physical address of the memory to be migrated and a physical address of the first unusable memory is stored through Step 702, if the content stored in the computer is the mapping relation between an original physical address of the memory to be migrated and an original physical address of the first unusable memory, the process of determining whether there is a mapping relation to which the target physical address corresponds in the mapping relations stored in the computer through Step 703 may comprise firstly performing memory page alignment respectively for the mapping relations stored in the computer, subsequently performing memory page alignment for the physical address of the first unusable memory, and finally determining whether there is a physical address obtained by performing memory page alignment for the physical address of the first unusable memory in the mapping relations obtained by performing memory page alignment for the mapping relations stored in the computer. If the content stored in the computer is the mapping relation between a physical address, after memory page alignment, of the memory to be migrated and a physical address, after memory page alignment, of the first unusable memory, the process of determining whether there is a mapping relation to which the target physical address corresponds in the mapping relations stored in the computer through Step 703 may comprise firstly performing memory page alignment for the target physical address, and subsequently determining whether there is a physical address obtained after performing memory page alignment for the target physical address in the mapping relations stored in the computer. Determining whether there is a mapping relation to which the target physical address corresponds in the mapping relations stored in the computer in Step 703 may also be carried out by other means, which are not redundantly described seriatim herein.

In this embodiment, if it is determined through Step 703 that there is no mapping relation to which the target physical address corresponds in the mapping relations stored in the computer, namely that it is not necessary to perform address conversion, the OS can directly access the memory to which the target physical address belongs; if there is a mapping relation to which the target physical address corresponds in the mapping relations stored in the computer, the OS can access the memory after conversion of the target physical address through Step 704.

Step 704—accessing, when there is a mapping relation to which the target physical address corresponds, by the operating system, data in the first unusable memory according to the mapping relation to which the target physical address corresponds.

In this embodiment, when it is determined through Step 703 whether there is a mapping relation to which the target physical address corresponds in the mapping relations stored in the computer, if the mapping relation stored in the computer is a mapping relation between an original physical address of the remaining memory and an original physical address of the first unusable memory, the specific process of accessing data in the first unusable memory according to the mapping relation to which the target physical address corresponds through Step 704 may comprise firstly performing memory page alignment for the original physical address of the memory to be migrated to obtain an offset of the memory to be migrated, subsequently obtaining by the operating system a second physical address of the first unusable memory corresponding to the target physical address according to the mapping relation to which the target physical address corresponds, and accessing by the operating system data in the first unusable memory according to a sum of the offset and the second physical address. If the mapping relation stored in the computer is a mapping relation between a physical address, after memory page alignment, of the remaining memory and a physical address, after memory page alignment, of the first unusable memory, the specific process of accessing data in the first unusable memory according to the mapping relation to which the target physical address corresponds through Step 704 may comprise firstly obtaining by the OS an offset of the target physical address, subsequently obtaining by the OS a second physical address of the first unusable memory corresponding to the target physical address according to the mapping relation to which the target physical address corresponds, and accessing by the OS data in the first unusable memory according to a sum of the offset and the second physical address.

Figure 8:
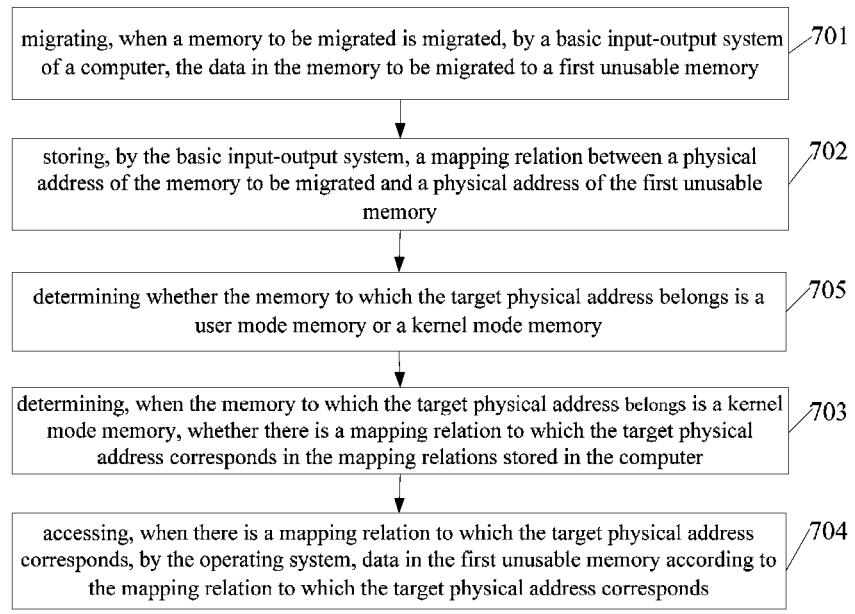
FIG. 8 is a second flowchart illustrating the method for implementing memory migration provided by Embodiment 7 of the present application.

Moreover, in order to optimize the process of determining whether there is a mapping relation to which the target physical address corresponds in the mapping relations stored in the computer in Step 703, the method for implementing memory migration provided by this embodiment may further comprise the following step, as shown in FIG. 8.

Step 705—determining whether the memory to which the target physical address belongs is a user mode memory or a kernel mode memory.

In this embodiment, since the user mode memory is migratable by the OS, while the kernel mode memory is not migratable by the OS, the kernel mode memory can be migrated only by the BIOS, and when the kernel mode memory is accessed again after the kernel mode memory is migrated by the BIOS, it might be necessary to obtain the memory position of the migrated kernel mode memory through a mapping relation in the mapping relation table, whereas for the user mode memory migrated by the OS, it can be accessed directly through the updated page table entries. Therefore, in order to simplify the determining process in Step 703, it is possible to firstly determine through Step 705 whether the memory to which the target physical address belongs is a user mode memory or a kernel mode memory, and to access directly through the page table entries when the memory to which the target physical address belongs is a user mode memory; whereas when the memory to which the target physical address belongs is a kernel mode memory, it is determined again through Step 703 whether there is a mapping relation for the address after the target physical address is already undergone memory page alignment in the mapping relation table.

In this case, Step 703 would be determining whether there is a mapping relation to which the target physical address corresponds in the mapping relations stored in the computer when the memory to which the target physical address belongs is the kernel mode memory.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 9:
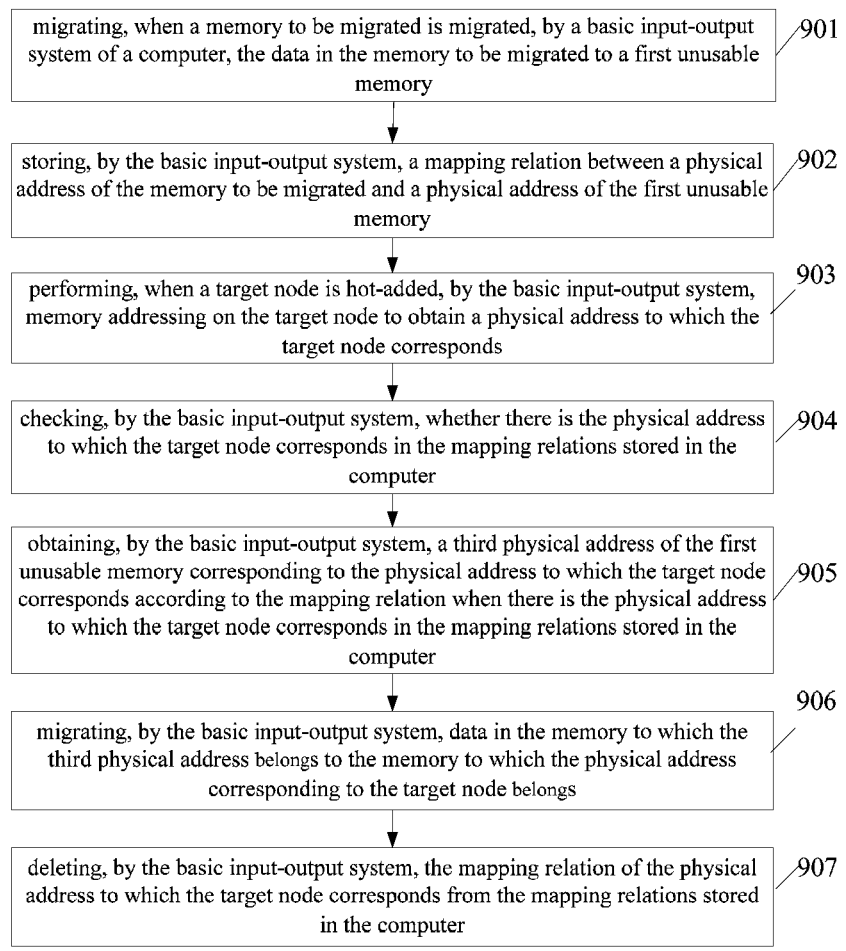
FIG. 9 is a flowchart illustrating the method for implementing memory migration provided by Embodiment 8 of the present application.

As shown in FIG. 9, the method for implementing memory migration provided by Embodiment 8 of the present application comprises the following steps.

Step 901 to Step 902—migrating, when the memory to be migrated is migrated, by the basic input-output system, the data in the memory to be migrated to the first unusable memory, and storing a mapping relation between a physical address of the memory to be migrated and a physical address of the first unusable memory. The specific processes thereof can be seen with reference to Step 101 to Step 102 shown in FIG. 1, while the details are not redundantly described seriatim herein.

Step 903—performing, when a target node is hot-added, by the basic input-output system, memory addressing on the target node to obtain a physical address to which the target node corresponds.

In this embodiment, performing memory addressing on the target node in Step 903 makes it possible for the physical address corresponding to the target node to remain unchanged when the target node is a node originally hot-removed; when the target node is not a node originally hot-removed, the physical address of the target node can be located behind the address space of each original node.

Step 904—checking, by the basic input-output system, whether there is the physical address to which the target node corresponds in the mapping relations stored in the computer.

In this embodiment, checking through Step 904 whether there is a physical address to which the target node corresponds in the mapping relations stored in the computer makes it possible to directly hot-add the target node when there is no physical address to which the target node corresponds in the mapping relations stored in the computer; when there is the physical address to which the target node corresponds in the mapping relations stored in the computer, the target node is hot-added through Step 905.

Step 905—obtaining, by the basic input-output system, a third physical address of the first unusable memory corresponding to the physical address to which the target node corresponds according to the mapping relation when there is the physical address to which the target node corresponds in the mapping relations stored in the computer.

Step 906—migrating, by the basic input-output system, data in the memory to which the third physical address belongs to the memory to which the physical address corresponding to the target node belongs.

Step 907—deleting, by the basic input-output system, the mapping relation of the physical address to which the target node corresponds from the mapping relations stored in the computer.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

In order to enable persons skilled in the art to implement the method and device for implementing memory migration provided by the embodiments of the present application, concrete examples are provided below to specifically explain the method and device for implementing memory migration provided by the embodiments of the present application.

Figure 10:
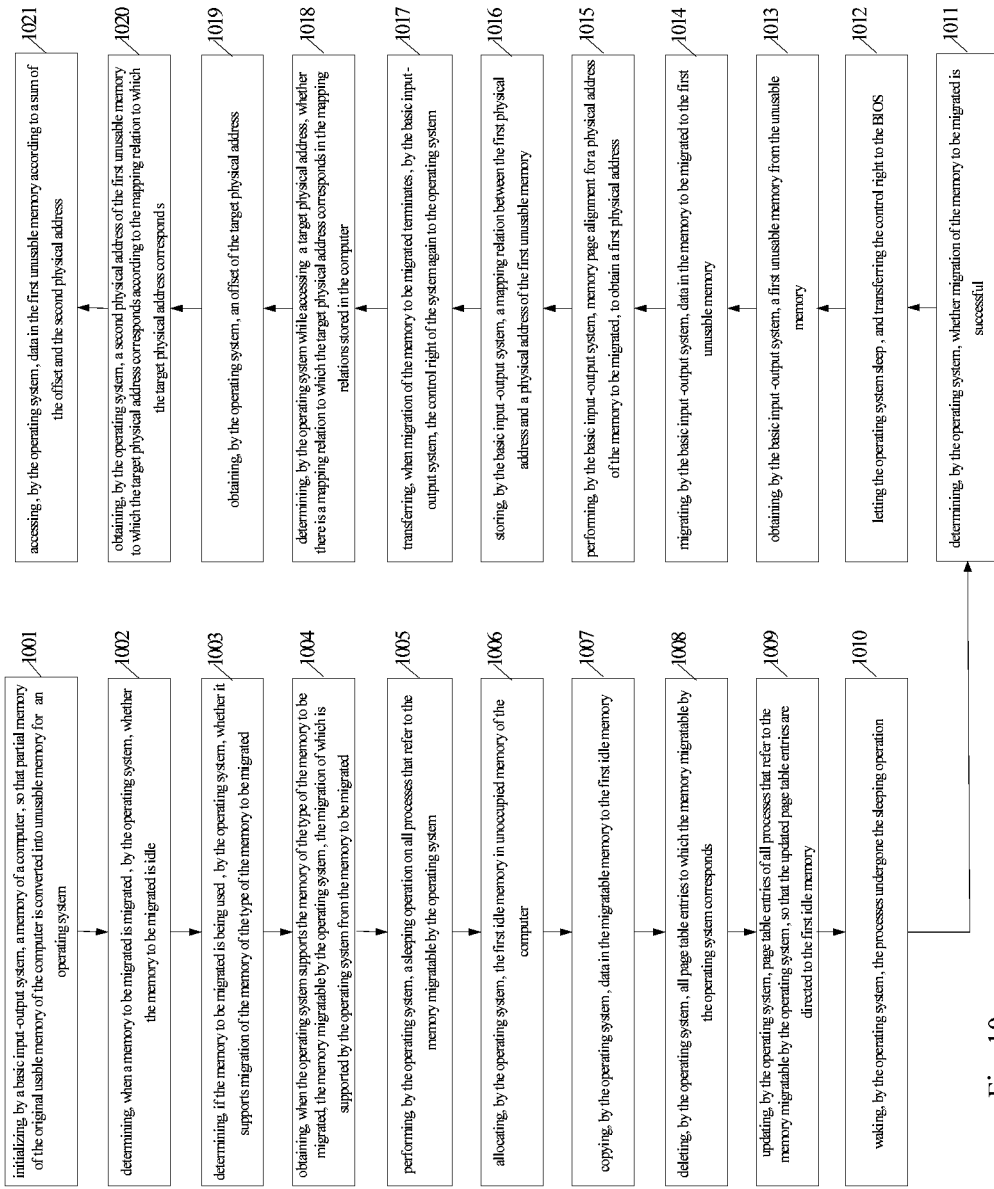
FIG. 10 is a flowchart illustrating the method for implementing memory migration provided by Embodiment 9 of the present application.

As shown in FIG. 10, the method for implementing memory migration provided by Embodiment 9 of the present application comprises the following steps.

In the following, explanation is made with respect to the example of a small granular memory in which repetitive errors have been found to occur in certain memories by a management program of the OS and hence in need of migration and isolation.

Step 1001—initializing, by a basic input-output system, a memory of a computer, so that partial memory of the original usable memory of the computer is converted into unusable memory of an operating system.

In this embodiment, in order to simplify the memory migration operating process, the process of initializing the memory of the computer through Step 1001 can be performed during startup of the computer system. The process of initializing the memory of the computer through Step 1001 can be implemented by addressing the memory to generate an e820 map, and can also be implemented by other means, which are not redundantly described seriatim herein. Initializing of the memory of the computer in Step 1001 can not only comprise converting partial memory of the original usable memory of the computer into memory unusable for the OS, but also comprise setting the size of the unusable memory of the OS, or the like, while no restriction is made thereto. Setting the size of the unusable memory of the OS can be not only to set the unusable memory of the OS as a memory of fixed size, but also to set the unusable memory of the OS as a memory of adjustable size—that is to say, the size of the unusable memory of the OS is set in the BIOS according to the size of the system memory.

In this embodiment, since the OS manages the memory in the unit of memory page, the size of the unusable memory of the OS should be a multiple of the memory pages, and the memory should be migrated in the unit of memory page during the memory migration.

Step 1002—determining, when a memory to be migrated is migrated, by the operating system, whether the memory to be migrated is idle.

In this embodiment, when it is determined through Step 1002 that the memory to be migrated is idle, the system can directly return, namely it is not necessary to migrate the memory to be migrated; when it is determined through Step 1002 that the memory to be migrated is being used, the memory to be migrated can be processed through Step 1003.

Step 1003—determining, if the memory to be migrated is being used, by the operating system, whether it supports migration of the memory of the type of the memory to be migrated.

In this embodiment, it is determined through Step 1003 whether the OS supports migration of the memory of the type of the memory to be migrated; if not, the system can directly return; if yes, the memory migratable by the OS can be obtained through Step 1004.

Step 1004—obtaining, when the operating system supports the memory of the type of the memory to be migrated, the memory migratable by the operating system, the migration of which is supported by the operating system from the memory to be migrated.

In this embodiment, since the OS can implement migration of partial memory, but cannot implement migration of most kernel mode memory, the memory migratable by the OS in Step 1004 may mainly comprise user mode memory, and may also comprise a few of kernel mode memory.

In this embodiment, obtaining from the memory to be migrated the memory migratable by the OS, the migration of which is supported by the OS, through Step 1004 can be that not only the OS directly obtains the memory migratable by the OS from the memory to be migrated, but also the OS firstly determines the memory to be migrated, and then obtains the memory migratable by the OS from the memory to be migrated according to the determination result. It is also possible for the OS to obtain the memory migratable by the OS from the memory to be migrated by other means, which are not redundantly described seriatim herein.

Step 1005—performing, by the operating system, a sleeping operation on all processes that refer to the memory migratable by the operating system.

Step 1006—allocating, by the operating system, the first idle memory in unoccupied memory of the computer.

In this embodiment, allocating the first idle memory in unoccupied memory of the computer in Step 1006 can be not only to allocate the first idle memory to any position of the unoccupied memory of the computer, but also to sequentially allocate the first idle memory according to the order of the physical addresses of the unoccupied memory of the computer, while the details are not redundantly described seriatim herein.

Step 1007—copying, by the operating system, data in the migratable memory to the first idle memory.

Step 1008—deleting, by the operating system, all page table entries to which the memory migratable by the operating system corresponds.

Step 1009—updating, by the operating system, page table entries of all processes that refer to the memory migratable by the operating system, so that the updated page table entries are directed to the first idle memory.

Step 1010—waking, by the operating system, the processes undergone the sleeping operation.

Step 1011—determining, by the operating system, whether migration of the memory to be migrated is successful.

In this embodiment, successful migration of the memory to be migrated in Step 1011 means that the memory to be migrated is entirely copied to other memory of the system. If there is only partial memory is copied, this indicates that migration of the memory to be migrated is failed. When it is determined through Step 1011 that migration of the memory to be migrated is successful, the system directly returns; when it is failed, the control right of the computer system is delegated from the OS to the BIOS through Step 1012.

Step 1012—letting the operating system sleep, and transferring the control right to the BIOS.

Step 1013—obtaining, by the basic input-output system, the first unusable memory from the unusable memory.

In this embodiment, obtaining the first unusable memory from the unusable memory of the OS through Step 1013 can be for the BIOS to sequentially obtain the first unusable memory sized as the memory to be migrated from the unusable memory of the OS according to the order of the physical addresses of the unusable memory of the OS.

In this embodiment, the first unusable memory is obtained from the unusable memory of the OS through Step 1013; if the obtaining is failed, i.e. the unusable memory of the OS has been used up, the BIOS prompts the user that migration of the memory is failed; if the obtaining is successful, data in the memory to be migrated is migrated to the first unusable memory through Step 1014.

Step 1014—migrating, by the basic input-output system, data in the memory to be migrated to the first unusable memory.

In this embodiment, the process of migrating data in the memory to be migrated to the first unusable memory through Step 1014 can be to copy the data in the memory to be migrated to the first unusable memory, or the like, while no restriction is made thereto.

Step 1015—performing, by the basic input-output system, memory page alignment for the physical address of the memory to be migrated, to obtain a first physical address.

In this embodiment, the physical address of the memory to be migrated in Step 1015 can be recorded in a storage device of the computer, and can also be recorded in other positions of the computer, while the details are not redundantly described seriatim herein.

Step 1016—storing, by the basic input-output system, a mapping relation between the first physical address and a physical address of the first unusable memory.

In this embodiment, in order to facilitate the OS to subsequently use data in the remaining memory, it is possible to firstly align a physical address of the memory to be migrated through Step 1015, and then to store the mapping relation between the physical address of the aligned remaining memory and the physical address of the first unusable memory through Step 1016.

Step 1017—transferring, when migration of the memory to be migrated terminates, by the basic input-output system, the control right of the system again to the operating system.

Step 1018—determining, by the operating system while accessing a target physical address, whether there is a mapping relation to which the target physical address corresponds in the mapping relations stored in the computer.

In this embodiment, if it is determined through Step 1018 that there is no mapping relation to which the target physical address corresponds in the mapping relations stored in the computer, the system can directly access the content of the memory to which the target physical address belongs without performing address conversion; if there is, an offset of the target physical address can be obtained through Step 1019.

Step 1019—obtaining, by the operating system, an offset of the target physical address.

Step 1020—obtaining, by the operating system, a second physical address of the first unusable memory to which the target physical address corresponds according to the mapping relation to which the target physical address corresponds.

Step 1021—accessing, by the operating system, data in the first unusable memory according to a sum of the offset and the second physical address.

In this embodiment, the memory to be migrated can be a memory to be migrated to which the physical address belongs in an command sent by a management program of the OS, and can also be a corresponding memory to be migrated which is obtained according to a virtual address manually input by the user. It is usual for the memory to be migrated to take one memory page as a unit.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 11:
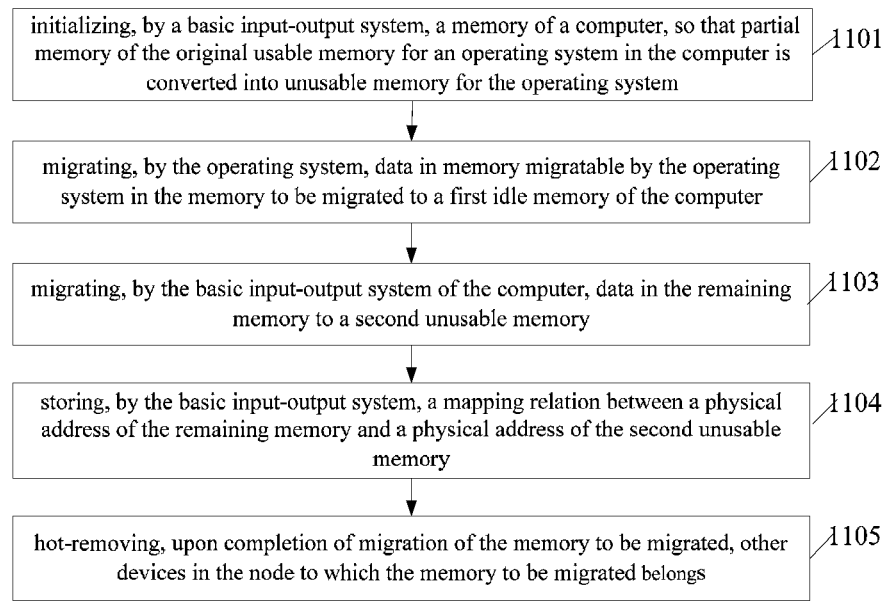
FIG. 11 is a first flowchart illustrating the method for implementing memory migration provided by Embodiment 10 of the present application.

As shown in FIG. 11, the method for implementing memory migration provided by Embodiment 10 of the present application comprises the following steps.

In the following, explanation is made with respect to the example that a node memory needs hot removal in order to reduce power consumption of the system in a case that a memory to be migrated is of an NUMA architecture.

Step 1101—initializing, by a basic input-output system, a memory of the computer, so that partial memory of the original usable memory of an operating system in the computer is converted into unusable memory of the operating system.

Figure 12:
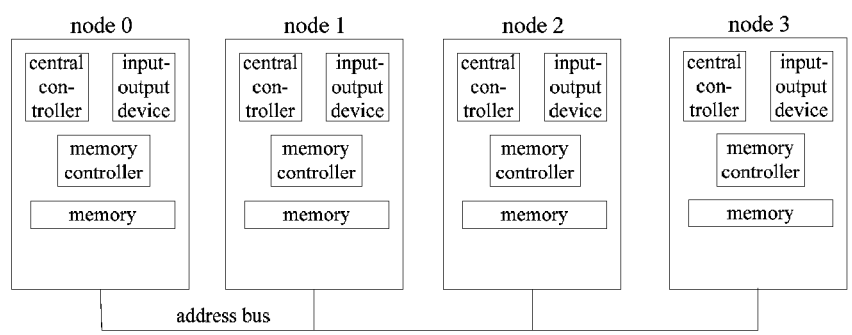
FIG. 12 is a schematic view illustrating the structure of an NUMA architecture system with four nodes provided by Embodiment 10 of the present application.

In this embodiment, as shown in FIG. 12, an NUMA architecture with four nodes is taken for example for the explanation. Each node in the NUMA architecture comprises a central processor, an input-output device and memory. Since node 0 is usually set as the main node to run the OS of the entire system, it cannot be hot-removed. Converting partial memory of the original usable memory into unusable memory of the operating system through Step 1101 may set the memory in node 1 as the unusable memory of the OS. In order to make it easy for other nodes to search for data migrated to node 1, the memory of node 1 can be divided into two parts, respectively corresponding to memories not migratable by the OS in node 2 and node 3.

Step 1102—migrating, by the operating system, data in memory migratable by the operating system in the memory to be migrated to a first idle memory of the computer.

In this embodiment, the first idle memory in Step 1102 may be any other node of relatively light load except the hot-removed node. The process of migrating data in the memory migratable by the OS to the first idle memory in Step 1102 can be seen with reference to Step 501 in FIG. 5, while the details are not redundantly described seriatim herein.

Step 1103—migrating, by the BIOS, data in the remaining memory to a second unusable memory. The specific process thereof can be seen with reference to Step 502 in FIG. 5, while the details are not redundantly described seriatim herein.

Step 1104—storing a mapping relation between a physical address of the remaining memory and a physical address of the second unusable memory. The specific process thereof can be seen with reference to Step 503 in FIG. 5, while the details are not redundantly described seriatim herein.

Step 1105—hot-removing, upon completion of migration of the memory to be migrated, other devices in the node to which the memory to be migrated belongs.

Figure 13:
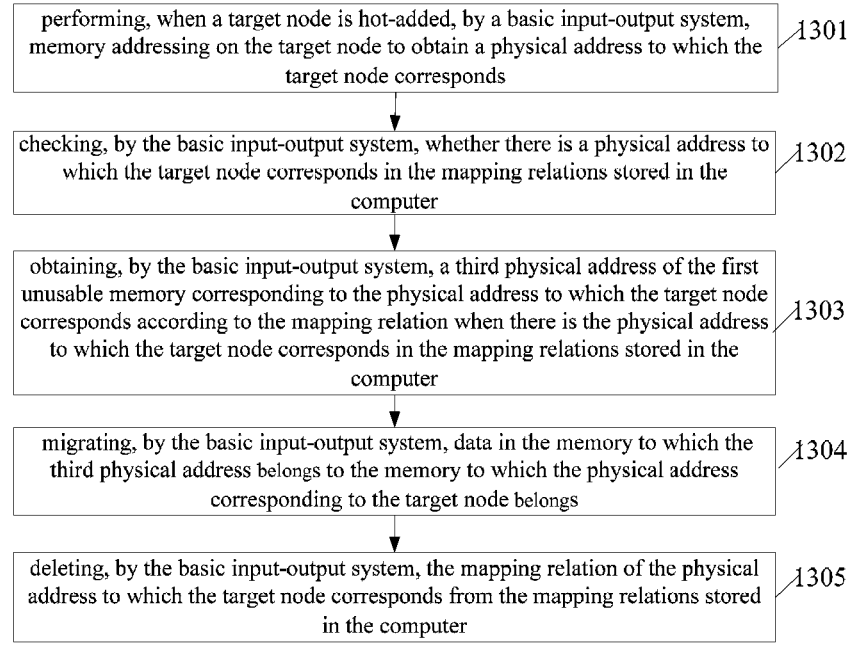
FIG. 13 is a second flowchart illustrating the method for implementing memory migration provided by Embodiment 10 of the present application.

Moreover, the method for implementing memory migration provided by this embodiment can also hot-add nodes, as shown in FIG. 13, and comprises the following steps.

Step 1301—performing, when a target node is hot-added, by the basic input-output system, memory addressing on the target node to obtain a physical address to which the target node corresponds.

In this embodiment, performing memory addressing on the target node in Step 1301 makes it possible for the physical address corresponding to the target node to remain unchanged when the target node is a node originally hot-removed; when the target node is not a node originally hot-removed, the physical address corresponding to the target node can be located behind the address space of each original node.

Step 1302—checking, by the basic input-output system, whether there is a physical address to which the target node corresponds in the mapping relations stored in the computer.

In this embodiment, checking through Step 1302 whether there is a physical address to which the target node corresponds in the mapping relations stored in the computer makes it possible to directly hot-add the target node when there is no physical address to which the target node corresponds in the mapping relations stored in the computer; when there is the physical address to which the target node corresponds in the mapping relations stored in the computer, the target node is hot-added through Step 905.

Step 1303—obtaining, by the basic input-output system, a third physical address of the first unusable memory corresponding to the physical address to which the target node corresponds according to the mapping relation when there is the physical address to which the target node corresponds in the mapping relations stored in the computer.

Step 1304—migrating, by the basic input-output system, data in the memory to which the third physical address belongs to the memory to which the physical address corresponding to the target node belongs.

Step 1305—deleting, by the basic input-output system, the mapping relation of the physical address to which the target node corresponds from the mapping relations stored in the computer.

Figure 14:
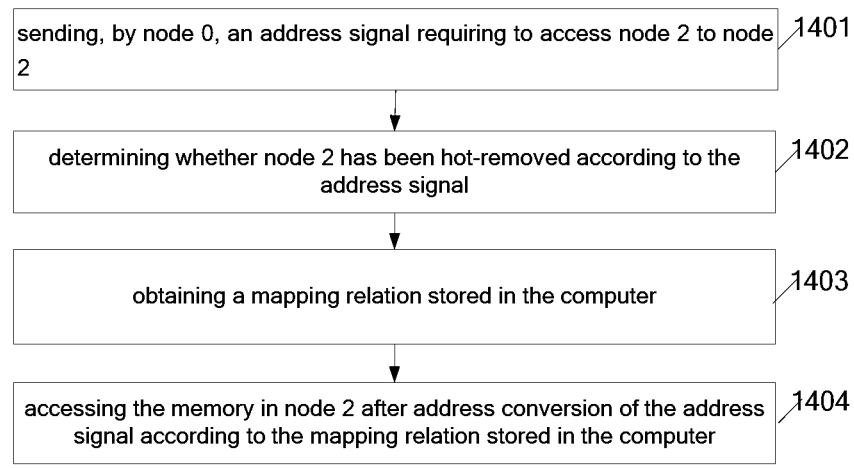
FIG. 14 is a third flowchart illustrating the method for implementing memory migration provided by Embodiment 10 of the present application.

Moreover, the method for implementing memory migration provided by this embodiment can further perform cross-node access, as shown in FIG. 14, and comprises the following steps.

In the following, explanation is made with respect to the example of a central processor in node 0 accessing the memory in node 2, while other cross-node accessing processes are similar to the following process, and are hence not redundantly described seriatim herein.

Step 1401—sending, by node 0, an address signal requiring to access node 2 to node 2.

Step 1402—determining whether node 2 has been hot-removed according to the address signal.

In this embodiment, if it is determined through Step 1402 that node 2 is not hot-removed, it is possible for node 0 to directly access the memory in node 2; if it is determined that node 2 has been hot-removed, a mapping relation stored in the computer is obtained through Step 1403.

Step 1403—obtaining a mapping relation stored in the computer.

Step 1404—accessing the memory in node 2 after address conversion of the address signal according to the mapping relation stored in the computer.

In this embodiment, if the central processor of the present node is to access the memory of the present node, the system can directly access, while no redundant description thereof is made here.

The method for implementing memory migration provided by this embodiment can be implemented by combining the BIOS with corresponding computer hardware, and the details are not redundantly described seriatim herein.

In the method for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

Figure 15:
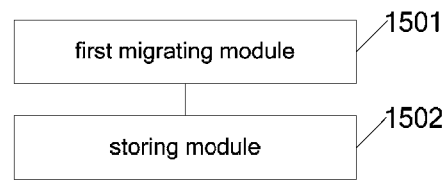
FIG. 15 is a first schematic view illustrating the structure of the device for implementing memory migration provided by Embodiment 11 of the present application.

As shown in FIG. 15, the device for implementing memory migration provided by Embodiment 11 of the present application comprises the following.

A first migrating module 1501 is configured to migrate, when a memory to be migrated is migrated, by a basic input-output system of a computer, data in the memory to be migrated to a first unusable memory of an operating system of the computer, wherein the first unusable memory is converted in advance from an original usable memory of the operating system, which is a memory set as reserved for the operating system, and unmodifiable by and inaccessible to the operating system.

In this embodiment, the process of migrating data in the memory to be migrated to a first unusable memory of the OS of the computer through the first migrating module 1501 can be to copy the data in the memory to be migrated to the first unusable memory, or the like, while no restriction is made thereto. The first unusable memory may be converted in advance from an original usable memory. The BIOS may address the memory uniformly while addressing the memory to generate an e820 map during system startup, to make part of the memory usable for the OS and another part of the memory unusable for the OS.

In this embodiment, since the original unusable memory of the computer is usually occupied by the original process of the computer, the first unusable memory in the first migrating module 1501 can be a part of memory converted in advance from the original usable memory, and can also be a part of memory newly configured by the OS by other means, which are not redundantly described seriatim herein. That is to say, migrating the data in the memory to be migrated to the first unusable memory can be to migrate the data in the memory to be migrated to any position in the memory converted in advance from the original usable memory, and can also be to sequentially migrate the data in the remaining memory to the memory converted in advance from the original usable memory according to the order of the physical addresses of the memory converted in advance from the original usable memory, while the details are not redundantly described seriatim herein.

In this embodiment, the memory to be migrated in the first migrating module 1501 can be a small granular memory in which repetitive errors have been found to occur in a certain memory by a management program of the OS and hence in need of migration and isolation, and can also be a node memory in need of hot removal in order to reduce power consumption of the system in the NUMA architecture. It can as well be a memory that should be migrated under other circumstances, which are not redundantly described seriatim herein.

A storing module 1502 is configured to store, by the basic input-output system, a mapping relation between a physical address of the memory to be migrated and a physical address of the first unusable memory.

In this embodiment, the mapping relation between a physical address of the memory to be migrated and a physical address of the first unusable memory in the storing module 1502 can be a mapping relation between a physical address, after memory page alignment, of the memory to be migrated and a physical address, after memory page alignment, of the first unusable memory, or the like, while the details are not redundantly described seriatim herein. The mapping relation can be stored in any position of the computer, and can also be stored in such a storage device as a flash memory separately provided for mapping relations. It is also possible to store the mapping relation by other means, which are not redundantly described seriatim herein.

Figure 16:
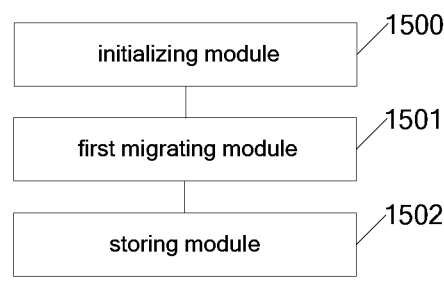
FIG. 16 is a second schematic view illustrating the structure of the device for implementing memory migration provided by Embodiment 11 of the present application.

Moreover, as shown in FIG. 16, the device for implementing memory migration in this embodiment may also comprise the following.

An initializing module 1500 is configured to initialize, by the basic input-output system, a memory of the computer, so that partial memory of the original usable memory of the computer is converted into unusable memory of the operating system.

In this embodiment, in order to simplify the memory migration operating process, the process of initializing the memory of the computer through the initializing module 1500 can be performed during startup of the computer system. The process of initializing the memory of the computer through the initializing module 1500 can be implemented by addressing the memory to generate an e820 map, and can also be implemented by other means, which are not redundantly described seriatim herein. Initializing of the memory of the computer in the initializing module 1500 can not only comprise converting partial memory of the original usable memory of the computer into memory unusable for the OS, but also comprise setting the size of the unusable memory of the OS, or the like, while no restriction is made thereto. Setting the size of the unusable memory of the OS can be not only to set the unusable memory of the OS as a memory of fixed size, but also to set the unusable memory of the OS as a memory of adjustable size—that is to say, the size of the unusable memory of the OS is set in the BIOS according to the size of the system memory.

Figure 17:
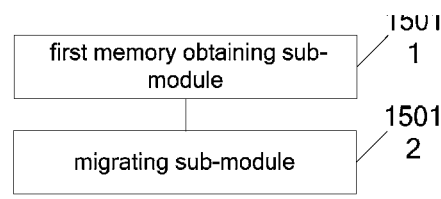
FIG. 17 is a schematic view illustrating the structure of the first migrating module in the device for implementing memory migration illustrated in FIG. 15.

In this case, as shown in FIG. 17, the first migrating module 1501 in this embodiment can comprise the following.

A first memory obtaining sub-module 15011 is configured to obtain, by the basic input-output system, the first unusable memory from the unusable memory of the operating system.

In this embodiment, obtaining the first unusable memory from the unusable memory of the OS through the first memory obtaining sub-module 15011 can be for the BIOS to obtain the first unusable memory sized as the memory to be migrated sequentially from the unusable memory of the OS according to the order of the physical addresses of the unusable memory of the OS.

A migrating sub-module 15012 is configured to migrate, by the basic input-output system, data in the memory to be migrated to the first unusable memory.

In this embodiment, the process of migrating data in the memory to be migrated to the first unusable memory through the migrating sub-module 15012 can be to copy the data in the memory to be migrated to the first unusable memory, or the like, while no restriction is made thereto.

Figure 18:
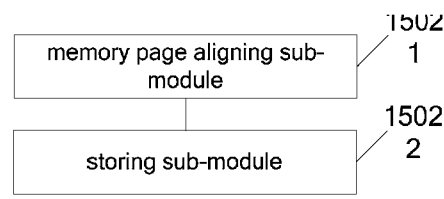
FIG. 18 is a schematic view illustrating the structure of the storing module in the device for implementing memory migration illustrated in FIG. 15.

Moreover, as shown in FIG. 18, the storing module 1502 in this embodiment can comprise the following.

A memory page aligning sub-module 15021 is configured to perform, by the basic input-output system, memory page alignment for the physical address of the memory to be migrated, to obtain a first physical address.

A storing sub-module 15022 is configured to store, by the basic input-output system, a mapping relation between the first physical address and the physical address of the first unusable memory.

In this embodiment, in order to facilitate the OS to subsequently use data in the remaining memory, it is possible to firstly align a physical address of the memory to be migrated through the memory page aligning sub-module 15021, and then to store the mapping relation between the physical address of the aligned remaining memory and the physical address of the first unusable memory through the storing sub-module 15022.

Figure 19:
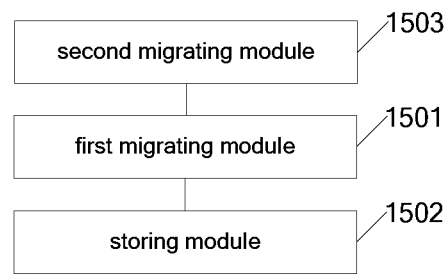
FIG. 19 is a third schematic view illustrating the structure of the device for implementing memory migration provided by Embodiment 11 of the present application.

Moreover, as shown in FIG. 19, the device for implementing memory migration in this embodiment may also comprise the following.

A second migrating module 1503 is configured to migrate, by the operating system of the computer, data in memory migratable by the operating system in the memory to be migrated to a first idle memory of the computer.

In this embodiment, since the OS can implement migration of partial memory, but cannot implement migration of most kernel mode memory, the memory migratable by the operating system in the second migrating module 1503 may comprise a mass of user mode memory and/or a few of kernel mode memory.

In this embodiment, the first idle memory in the second migrating module 1503 can be a part of the memory currently not occupied by the computer; that is to say, migrating the data in the memory migratable by the OS to the first idle memory can be to migrate the data in the memory migratable by the OS to any position in the memory currently not occupied by the computer, and can also be to sequentially migrate the data in the memory migratable by the OS to the memory currently not occupied by the computer according to the order of the physical addresses of the memory currently not occupied by the computer, while the details are not redundantly described seriatim herein.

In this embodiment, migrating the data in the memory migratable by the OS to the first idle memory in the second migrating module 1503 may comprise firstly performing a sleeping operation, by the OS, on all processes that refer to the memory migratable by the OS, secondly allocating part of the memory, namely the first idle memory, in the memory currently not occupied by the computer, and migrating the data in the memory migratable by the OS to the first idle memory, subsequently deleting, by the OS, page table entries corresponding to the memory migratable by the OS, and updating page table entries in all processes that refer to the memory migratable by the OS so that they are directed to the first idle memory, and finally waking the sleeping processes by the OS. The second migrating module 1503 can also migrate the data in the memory migratable by the OS to the first idle memory by other means, while no restriction is made thereto. The memory allocated by the OS in the memory currently not occupied by the computer can be a preset memory of a fixed size, or a memory allocated according to the size of the memory migratable by the OS, or a memory allocated by other means, which are not redundantly described seriatim herein.

In this embodiment, migrating the data in the memory migratable by the OS to the first idle memory through the second migrating module 1503 can be directly to migrate the data in the memory migratable by the OS to the first idle memory, but also to firstly query whether the memory migratable by the OS is currently in use, and if yes, to migrate the data in the memory migratable by the OS to the first idle memory. It is also possible to migrate the data in the memory migratable by the OS to the first idle memory by other means, which are not redundantly described seriatim herein.

In this case, the first migrating module 1501 is configured to migrate, by the basic input-output system of the computer, data in remaining memory to a second unusable memory, wherein the remaining memory is memory in the memory to be migrated except the memory migratable by the operating system, and the second unusable memory is a part of the first unusable memory.

Figure 20:
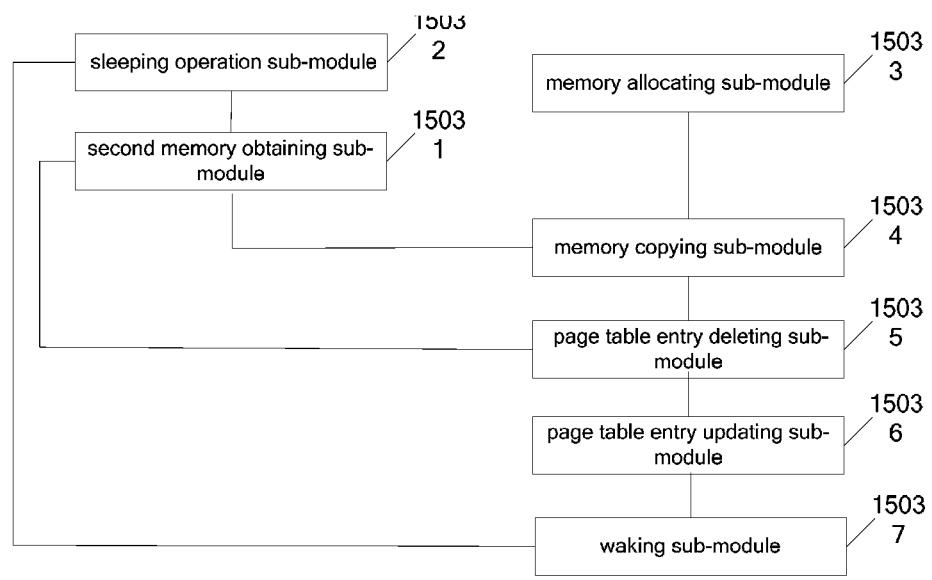
FIG. 20 is a schematic view illustrating the structure of the second migrating module in the device for implementing memory migration illustrated in FIG. 19.

As shown in FIG. 20, the second migrating module 1503 comprises the following.

A second memory obtaining sub-module 15031 is configured to obtain, by the operating system, from the memory to be migrated the memory migratable by the operating system, the migration of which is supported by the operating system.

In this embodiment, since the OS can implement migration of partial memory, but cannot implement migration of most kernel mode memory, the memory migratable by the OS in the second memory obtaining sub-module 15031 may mainly comprise user mode memory, and may also comprise a few of kernel mode memory.

In this embodiment, obtaining from the memory to be migrated the memory migratable by the OS, the migration of which is supported by the OS through the second memory obtaining sub-module 15031 can be that not only the OS directly obtains the memory migratable by the OS from the memory to be migrated, but also the OS firstly determines the memory to be migrated, and then obtains the memory migratable by the OS from the memory to be migrated according to the determination result. It is also possible for the OS to obtain the memory migratable by the OS from the memory to be migrated by other means, which are not redundantly described seriatim herein.

A sleeping operating sub-module 15032 is configured to perform, by the operating system, a sleeping operation on all processes that refer to the memory migratable by the operating system.

A memory allocating sub-module 15033 is configured to allocate, by the operating system, the first idle memory in unoccupied memory of the computer.

In this embodiment, allocating the first idle memory in unoccupied memory of the computer through the memory allocating sub-module 15033 can be not only to allocate the first idle memory to any position of the unoccupied memory of the computer, but also to sequentially allocate the first idle memory according to the order of the physical addresses of the unoccupied memory of the computer, while the details are not redundantly described seriatim herein.

A memory copying sub-module 15034 is configured to copy, by the operating system, data in the memory migratable by the operating system to the first idle memory.

A page table entry deleting sub-module 15035 is configured to deleting, by the operating system, all page table entries to which the memory migratable by the operating system corresponds.

A page table entry updating sub-module 15036 is configured to update, by the operating system, page table entries of all processes that refer to the memory migratable by the operating system, so that the updated page table entries are directed to the first idle memory.

A waking sub-module 15037 is configured to wake, by the operating system, the processes undergone the sleeping operation.

Figure 21:
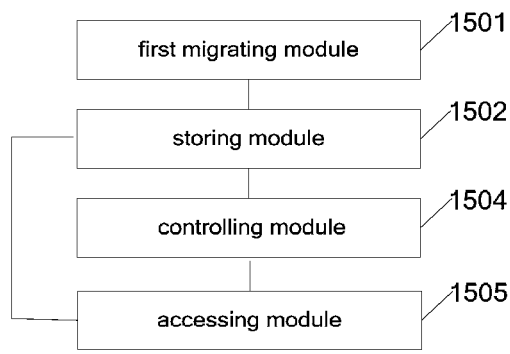
FIG. 21 is a fourth schematic view illustrating the structure of the device for implementing memory migration provided by Embodiment 11 of the present application.

Moreover, as shown in FIG. 21, the device for implementing memory migration in this embodiment can also comprise the following.

A controlling module 1504 is configured to determine, when the operating system accesses a target physical address, whether there is a mapping relation to which the target physical address corresponds in the mapping relations stored in the computer.

In this embodiment, when the mapping relation between a physical address of the memory to be migrated and a physical address of the first unusable memory is stored through the storing module 1502, if the content stored in the computer is the mapping relation between an original physical address of the memory to be migrated and an original physical address of the first unusable memory, the process of determining whether there is a mapping relation to which the target physical address corresponds in the mapping relations stored in the computer through the controlling module 1504 may comprise firstly performing memory page alignment respectively for the mapping relations stored in the computer, subsequently performing memory page alignment for the physical address of the first unusable memory, and finally determining whether there is a physical address obtained by performing memory page alignment for the physical address of the first unusable memory in the mapping relations obtained by performing memory page alignment for the mapping relations stored in the computer. If the content stored in the computer is the mapping relation between a physical address, after memory page alignment, of the memory to be migrated and a physical address, after memory page alignment, of the first unusable memory, the process of determining whether there is a mapping relation to which the target physical address corresponds in the mapping relations stored in the computer through the controlling module 1504 may comprise firstly performing memory page alignment for the target physical address, and subsequently determining whether there is a physical address obtained after performing memory page alignment for the target physical address in the mapping relations stored in the computer. The controlling module 1504 may also determine whether there is a mapping relation to which the target physical address corresponds in the mapping relations stored in the computer by other means, which are not redundantly described seriatim herein.

In this embodiment, if it is determined through the controlling module 1504 that there is no mapping relation to which the target physical address corresponds in the mapping relations stored in the computer, namely that it is not necessary to perform address conversion, the OS can directly access the memory to which the target physical address belongs; if there is a mapping relation to which the target physical address corresponds in the mapping relations stored in the computer, the OS can access the memory after conversion of the target physical address through an accessing module 1505.

An accessing module 1505 is configured to access, when there is a mapping relation to which the target physical address corresponds, by the operating system, data in the first unusable memory according to the mapping relation to which the target physical address corresponds.

In this embodiment, when it is determined through the controlling module 1504 whether there is a mapping relation to which the target physical address corresponds in the mapping relations stored in the computer, if the mapping relation stored in the computer is a mapping relation between an original physical address of the remaining memory and an original physical address of the first unusable memory, the specific process of accessing data in the first unusable memory according to the mapping relation to which the target physical address corresponds through the accessing module 1505 may comprise firstly performing memory page alignment for the original physical address of the memory to be migrated to obtain an offset of the memory to be migrated, subsequently obtaining by the operating system a second physical address of the first unusable memory corresponding to the target physical address according to the mapping relation to which the target physical address corresponds, and accessing by the operating system data in the first unusable memory according to a sum of the offset and the second physical address. If the mapping relation stored in the computer is a mapping relation between a physical address, after memory page alignment, of the remaining memory and a physical address, after memory page alignment, of the first unusable memory, the specific process of accessing data in the first unusable memory according to the mapping relation to which the target physical address corresponds through the accessing module 1505 may comprise firstly obtaining by the OS an offset of the target physical address, subsequently obtaining by the OS a second physical address of the first unusable memory corresponding to the target physical address according to the mapping relation to which the target physical address corresponds, and accessing by the OS data in the first unusable memory according to a sum of the offset and the second physical address.

Figure 22:
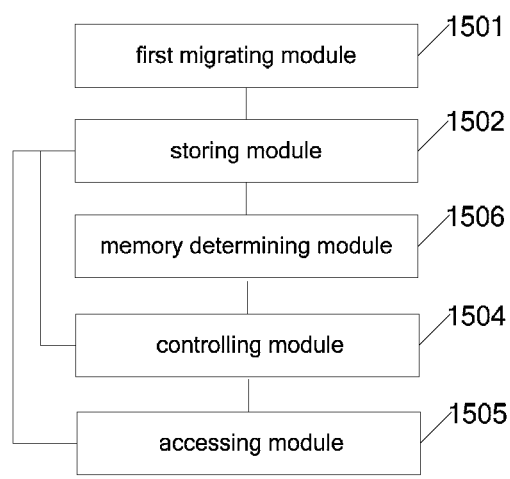
FIG. 22 is a fifth schematic view illustrating the structure of the device for implementing memory migration provided by Embodiment 11 of the present application.

In this case, as shown in FIG. 22, the device for implementing memory migration may also comprise the following.

A memory determining module 1506 is configured to determine whether the memory to which the target physical address belongs is a user mode memory or a kernel mode memory.

In this embodiment, since the user mode memory is migratable by the OS, while the kernel mode memory is not migratable by the OS, the kernel mode memory can be migrated only by the BIOS, and when the kernel mode memory is accessed again after the kernel mode memory is migrated by the BIOS, it might be necessary to obtain the memory position of the migrated kernel mode memory through a mapping relation in the mapping relation table, whereas for the user mode memory migrated by the OS, it can be accessed directly through the updated page table entries. Therefore, in order to simplify the determining process in the controlling module 1504, it is possible to firstly determine through the memory determining module 1506 whether the memory to which the target physical address belongs is a user mode memory or a kernel mode memory, and to access directly through the page table entries when the memory to which the target physical address belongs is a user mode memory; whereas when the memory to which the target physical address belongs is a kernel mode memory, it is determined again through the memory determining module 1506 whether there is a mapping relation for the address after the target physical address is already undergone memory page alignment in the mapping relation table.

The controlling module 1504 is configured to determine whether there is a mapping relation to which the target physical address corresponds in the mapping relations stored in the computer when the memory to which the target physical address belongs is the kernel mode memory.

Figure 23:
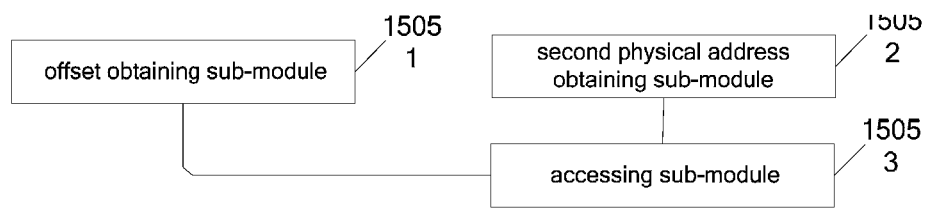
FIG. 23 is a schematic view illustrating the structure of the accessing module in the device for implementing memory migration illustrated in FIG. 21.

In this case, as shown in FIG. 23, the accessing module 1505 may comprise the following.

An offset obtaining sub-module 15051 is configured to obtain, by the operating system, an offset of the target physical address.

A second physical address obtaining sub-module 15052 is configured to obtain, by the operating system, a second physical address of the first unusable memory to which the target physical address corresponds according to the mapping relation to which the target physical address corresponds.

An accessing sub-module 15053 is configured to access, by the operating system, data in the first unusable memory according to a sum of the offset and the second physical address.

Figure 24:
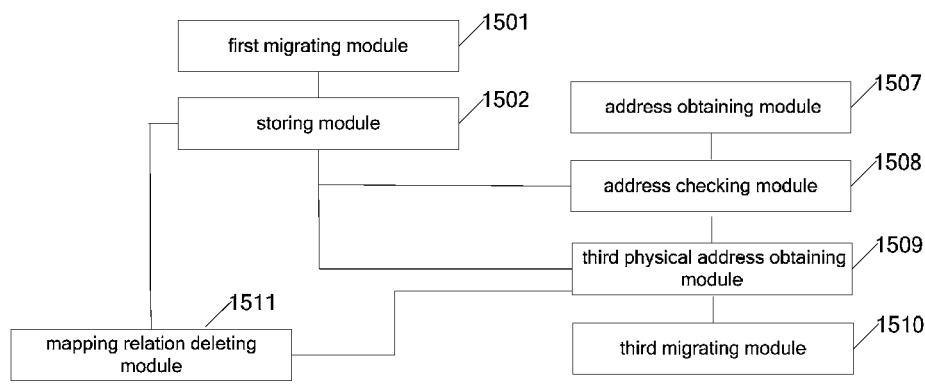
FIG. 24 is a sixth schematic view illustrating the structure of the device for implementing memory migration provided by Embodiment 11 of the present application.

Moreover, as shown in FIG. 24, the device for implementing memory migration in this embodiment may further comprise the following.

An address obtaining module 1507 is configured to perform, when a target node is hot-added, by the basic input-output system, memory addressing on the target node to obtain a physical address to which the target node corresponds.

In this embodiment, performing memory addressing on the target node through the address obtaining module 1507 makes it possible for the physical address corresponding to the target node to remain unchanged when the target node is a node originally hot-removed; when the target node is not a node originally hot-removed, the physical address corresponding to the target node can be located behind the address space of each original node.

An address checking module 1508 is configured to check, by the basic input-output system, whether there is a physical address to which the target node corresponds in the mapping relations stored in the computer.

In this embodiment, checking through the address checking module 1508 whether there is a physical address to which the target node corresponds in the mapping relations stored in the computer makes it possible to directly hot-add the target node when there is no physical address to which the target node corresponds in the mapping relations stored in the computer; when there is the physical address to which the target node corresponds in the mapping relations stored in the computer, the target node is hot-added through the address checking module 1508.

A third physical address obtaining module 1509 is configured to obtain, by the basic input-output system, a third physical address of the first unusable memory corresponding to the physical address to which the target node corresponds according to the mapping relation when there is the physical address to which the target node corresponds in the mapping relations stored in the computer.

A third migrating module 1510 is configured to migrate, by the basic input-output system, data in the memory to which the third physical address belongs to the memory to which the physical address corresponding to the target node belongs.

A mapping relation deleting module 1511 is configured to delete, by the basic input-output system, the mapping relation of the physical address to which the target node corresponds from the mapping relations stored in the computer.

The device for implementing memory migration provided by this embodiment can be implemented by combining the BIOS with corresponding computer hardware, and the details are not redundantly described seriatim herein.

In the device for implementing memory migration provided by the embodiments of the present application, when the memory to be migrated is migrated, the data in the memory to be migrated is migrated to the first unusable memory by the basic input-output system, and the mapping relation between the physical address of the memory to be migrated and the physical address of the first unusable memory is stored, thereby the memory migration is implemented. Since the first unusable memory is converted in advance, the process of initializing the first unusable memory is omitted when the memory migration is performed in the technical solutions provided by the embodiments of the present application, thus solving the problem, that is, the memory migration operating process is relatively complicated, in the prior art.

The method and device for implementing memory migration provided by the embodiments of the present application are applicable to the common computer system and a computer system under the NUMA architecture.

Steps of methods or algorithms described in combination with the embodiments disclosed in the context can be implemented directly by hardware, or by a combination of hardware with software modules executed by processors. The software modules can be placed in a random access memory (RAM), a memory, a read-only memory (ROM), an electronically programmable ROM, an electronically erasable and programmable ROM, a register, a hard disc, a movable magnetic disc, a CD-ROM, or storage media of any forms publicly known in this field of technology.

The above are merely directed to specific embodiments of the present application, but the protection scope of the present application is not restricted thereto, as any modification or substitution easily conceivable to persons skilled in the art within the technical scope disclosed in the present application shall fall within the protection scope of the present application. Therefore, the protection scope of the present application shall be based on the protection scope of the claims.

What is claimed is:

1. A method for implementing memory migration on a computer, comprising:

migrating, by a basic input-output system (BIOS) of the computer, data in a memory to be migrated to a first unusable memory of an operating system of the computer; wherein the first unusable memory is converted in advance of implementing the memory migration from an original usable memory of the operating system, and wherein the first unusable memory is reserved for the operating system, and the first unusable memory is unmodifiable by and inaccessible to the operating system, but is operable by the BIOS;

storing, by the BIOS, a mapping relation between a physical address of the memory to be migrated and a physical address of the first unusable memory;

determining, when the operating system accesses a target physical address, whether a mapping relation corresponds to the target physical address stored by the BIOS; and accessing, when the mapping relation corresponds to the target physical address that is stored, data in the first unusable memory according to the mapping relation corresponding to the target physical address.

2. The method according to claim 1, wherein prior to the migrating, by the BIOS of the computer, the data in the memory to be migrated to the first unusable memory of the operating system of the computer, the method further comprises:

converting, by the BIOS, partial memory of the original usable memory into unusable memory of the operating system, and wherein the unusable memory comprises the first unusable memory.

3. The method according to claim 2, wherein the migrating, by the BIOS of the computer, the data in the memory to the first unusable memory of the operating system of the computer comprises:

obtaining, by the BIOS, the first unusable memory from the unusable memory of the operating system; and migrating, by the basic input-output system, the data in the memory to be migrated to the first unusable memory.

4. The method according to claim 1, wherein the storing, by the BIOS, the mapping relation between the physical address of the memory to be migrated and the physical address of the first unusable memory comprises:
  performing, by the BIOS, memory page alignment for the physical address of the memory to be migrated, to obtain a first physical address of the memory; and
  storing, by the BIOS, the mapping relation between the first physical address of the memory and the physical address of the first unusable memory.

5. The method according to claim 1, wherein the memory to be migrated consists of a first area and a second area, and wherein before migrating the data in the memory to be migrated to the first unusable memory, the method further comprises:
  migrating, by the operating system, data in the first area to a idle memory of the computer; wherein the first area is migratable by the operating system;
  wherein the migrating, by the BIOS of the computer, the data in the memory to be migrated to the first unusable memory of the operating system of the computer comprises:
  migrating, by the BIOS of the computer, data in the second area to the first unusable memory of the operating system.

6. The method according to claim 5, wherein the migrating, by the operating system of the computer, the data in the first area to the idle memory of the computer comprises:
  performing, by the operating system, a sleeping operation on all processes that refer to the first area;
  allocating, by the operating system, the idle memory in unoccupied memory of the computer;
  copying, by the operating system, the data in the first area to the idle memory;
  deleting, by the operating system, all page table entries to which the first area corresponds;
  updating, by the operating system, page table entries of all processes that refer to the first area, so that the updated page table entries are directed to the idle memory; and
  waking, by the operating system, all the processes that refer to the first area which are undergone the sleeping operation.

7. The method according to claim 1, wherein the method further comprises:
  determining whether a target memory to which the target physical address belongs is a user mode memory or a kernel mode memory,
  determining whether the target mapping relationship is stored in the computer when the target memory is the kernel mode memory.

8. The method according to claim 1, wherein the accessing, the data in the first unusable memory comprises:
  obtaining, by the operating system, an offset of the target physical address;
  obtaining, by the operating system, a second physical address of the first unusable memory to which the target physical address corresponds according to the mapping relation to which the target physical address corresponds; and
  accessing, by the operating system, data in the first unusable memory according to a sum of the offset of the target physical address and the second physical address.

9. The method according to claim 1, wherein the computer is a node under a non uniform memory access architecture, the method further comprises:
  performing, when a target node is hot-added, by the BIOS, memory addressing on the target node to obtain a physical address to which the target node corresponds;
  checking, by the BIOS, whether the physical address to which the target node corresponds is stored in the computer;
  obtaining, by the BIOS, a third physical address of the first unusable memory corresponding to the physical address to which the target node corresponds according to the mapping relationship when the physical address to which the target node corresponds is stored in the computer;
  migrating, by the BIOS, data in the memory to which the third physical address belongs to the memory to which the physical address corresponding to the target node belongs; and
  deleting, by the BIOS, the mapping relationship of the physical address to which the target node corresponds from the mapping relationship stored in the computer.

10. A device for implementing memory migration comprising: a basic input-output system (BIOS), an operating system, and a storing module;
  wherein the basic input-output system (BIOS) being configured to migrating data in a memory to be migrated to a first unusable memory of the operating system; wherein the first unusable memory is converted in advance of implementing the memory migration from an original usable memory of the operating system and the first unusable memory is reserved for the operating system, the first unusable memory is unmodifiable by and inaccessible to the operating system, but is operable by the BIOS;
  the storing module, is configured to store a mapping relation between a physical address of the memory to be migrated and a physical address of the first unusable memory,
  wherein the operating system is further configured to:
  determine, when accessing a target physical address, whether a mapping relation corresponds to the target physical address stored by the BIOS; and
  access, when the mapping relation corresponds to the target physical address that is stored, data in the first unusable memory according to the mapping relation corresponding to the target physical address.

11. The device according to claim 10,
  wherein the BIOS is further configured to convert partial memory of the original usable memory into unusable memory of the operating system, and wherein the unusable memory comprises the first unusable memory.

12. The device according to claim 11, wherein
  the BIOS is further configured to obtain the first unusable memory from the unusable memory of the operating system; and
  migrate the data in the memory to be migrated to the first unusable memory.

13. The device according to claim 10, wherein the storing module is configured to:
  perform memory page alignment for the physical address of the memory to be migrated, to obtain a first physical address; and
  store a mapping relation between the first physical address and the physical address of the first unusable memory.

14. The device according to claim 10, wherein the memory to be migrated consists of a first area and a second area, and
> wherein the operating system is further configured to migrate data in the first area to a idle memory, wherein the first area is migratable by the operating system;
> wherein the BIOS is configured to migrate data in the second area to the first unusable memory.

15. The device according to claim 14, wherein
the operating system is configured to:
perform a sleeping operation on all processes that refer to the first area;
allocate
copy data in the first area to the idle memory;
delete all page table entries to which the first area corresponds;
update page table entries of all processes that refer to the first area, so that the updated page table entries are directed to the idle memory; and
wake the processes undergone the sleeping operation.

16. The device according to claim 10, wherein the operating system is further configured to:
> obtain an offset of the target physical address;
> obtain, a second physical address of the first unusable memory to which the target physical address corresponds according to the mapping relation to which the target physical address corresponds; and
> access data in the first unusable memory according to a sum of the offset and the second physical address.

* * * * *